United States Patent
Lindteigen et al.

(10) Patent No.: US 9,444,807 B2
(45) Date of Patent: *Sep. 13, 2016

(54) SECURE NON-GEOSPATIALLY DERIVED DEVICE PRESENCE INFORMATION

(71) Applicants: Ty Lindteigen, Chandler, AZ (US); James Chester Jones, Chandler, AZ (US); Dipen Patel, Chandler, AZ (US); Anthony Payne, Chandler, AZ (US)

(72) Inventors: Ty Lindteigen, Chandler, AZ (US); James Chester Jones, Chandler, AZ (US); Dipen Patel, Chandler, AZ (US); Anthony Payne, Chandler, AZ (US)

(73) Assignee: SAIFE, INC. AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/835,688

(22) Filed: Aug. 25, 2015

(65) Prior Publication Data

US 2015/0373006 A1    Dec. 24, 2015

Related U.S. Application Data

(63) Continuation of application No. 13/969,544, filed on Aug. 17, 2013, now Pat. No. 9,124,574.

(60) Provisional application No. 61/684,807, filed on Aug. 20, 2012.

(51) Int. Cl.
*H04L 29/06* (2006.01)
*H04L 29/08* (2006.01)

(52) U.S. Cl.
CPC .............. *H04L 63/08* (2013.01); *H04L 63/02* (2013.01); *H04L 63/0435* (2013.01); *H04L 63/083* (2013.01); *H04L 63/0815* (2013.01); *H04L 63/0869* (2013.01); *H04L 67/24* (2013.01)

(58) Field of Classification Search
None
See application file for complete search history.

(56) References Cited

U.S. PATENT DOCUMENTS

| | | | | |
|---|---|---|---|---|
| 7,900,245 B1* | 3/2011 | Geddes | ............... | H04L 63/0407 713/159 |
| 8,355,320 B1* | 1/2013 | Dhiman | ................ | H04L 67/24 370/229 |
| 2005/0015617 A1* | 1/2005 | Karsten | ............... | H04L 63/0209 726/4 |
| 2005/0262361 A1* | 11/2005 | Thibadeau | .............. | G06F 21/80 713/193 |
| 2007/0088839 A1* | 4/2007 | Yoakum | .............. | H04L 12/5815 709/228 |
| 2011/0213969 A1* | 9/2011 | Nakhjiri | ................ | H04L 63/061 713/158 |
| 2012/0039326 A1* | 2/2012 | Chia | ....................... | H04L 63/04 370/342 |

* cited by examiner

*Primary Examiner* — Hadi Armouche
*Assistant Examiner* — Andrew Steinle

(57) ABSTRACT

This invention includes a system and method to enable a device to determine the presence information of another device over a secure communication network. First, the device and a presence server establish a secure connection. Next, while the initial secure connection with the presence server is established, the device generates a randomly created token and provides it to the presence server. The token is used as a shared-secret by the device and the presence server to secure future presence communications over a non-secure connection. Next, without the need to again enter a password or establish a secure connection with the presence server, the device uses the shared-secret to sign, encrypt and convey presence information to the presence server over an arbitrary connection. Finally, the presence server may share the first device's presence information with another device.

18 Claims, 4 Drawing Sheets

SECURE NON-GEOSPATIALLY DERIVED DEVICE PRESENCE INFORMATION

CROSS-REFERENCE TO RELATED APPLICATIONS

The present application is related to and claims priority from prior non-provisional application Ser. No. 13/969,544 filed on Aug. 17, 2013 and provisional application Ser. No. 61/684,807 filed Aug. 20, 2012 the contents of which are incorporated herein by reference.

FIELD OF THE INVENTION

This invention relates generally to the field of communications, and particularly a method, apparatus, and system for securely conveying presence information via a secure network.

BACKGROUND OF THE INVENTION

People are heavily dependent on computing and communication devices to store, process, and transmit data across a vast system of communication networks. People all over the world use fixed and mobile computing and communication devices to perform personal and business tasks. Such use generates billions of data transmission each day via mobile and fixed communication devices such as smart phones, tablet PC's, notebook PC's, desktop PC's, or any other device that transmits data over a communication network.

It is important for a device to have knowledge about other devices in the communications network, such that the devices may communicate with each other. A device's software application may be enabled to communicate with a server to convey presence information so that a community of devices may know about each other and communicate with each other over the communications network. For example, an instant messaging application may require the user to provide a username and password so the server can authenticate and then track the presence of the user's device. The authentication process must be done every time a connection is established with the server. The requirement to authenticate the user becomes exasperated when a secure communication network is used. In a secure communication network, where the password is not stored in the device's memory, the user must enter the password many times. This effort is yet even more cumbersome in secure mobile communication networks where network conditions necessitate reestablishing connections to the server on an even more regular basis. This need to reestablish secure connections so many times makes it practically impossible to implement a secure presence feature for communication devices on a secure mobile communications network.

This invention provides a novel method, apparatus, and system in which the burden for a user of a device to enter credential information, such as a login name and password, is significantly less frequent than existing solutions. This invention enables a device to securely determine the presence information of another device over an unsecure or secure communication network.

BRIEF SUMMARY OF THE INVENTION

One embodiment of the invention is a system enabling a device to determine the presence information of another device over a secure communication network. First the system comprises at least one device. Next, the device is coupled via a firewall to an access point, to facilitate and manage communication amongst the many devices connected to the communication network. Next the access point is coupled to a communications network, such as the Internet or cellular infrastructure. Next a presence server is also coupled to the communications network. Next, the presence server may be connected to a private network via a firewall and/or virtual private network. Finally another device is connected to the network and available to receive information regarding the presence and status of the first device.

Another embodiment of the invention is a method to enable a device to determine the presence information of another device over a secure communication network. First, the device and a presence server establish a secure connection in which the device and the presence server authenticate each other. The user of the device provides a password to establish the initial secure connection with the presence server. Next, while the initial secure connection with the presence server is established, the device generates a randomly created token and provides it to the presence server over the secure connection. The token is used as a shared-secret by the device and the presence server to establish future presence communications over a secure, or even a non-secure connection. Next the initial secure connection may be terminated. Next, without the need to again enter a password or establish a secure connection with the presence server, the device uses the shared-secret to encrypt and/or sign and convey presence information to the presence server over an arbitrary connection. Next, the presence server may convey the device's presence information to another device. Next the token, or the shared-secret, expires based on ephemerally or other defined conditions. Finally, the device establishes a new token when the user again provides a password to establish another secure connection with the presence server.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
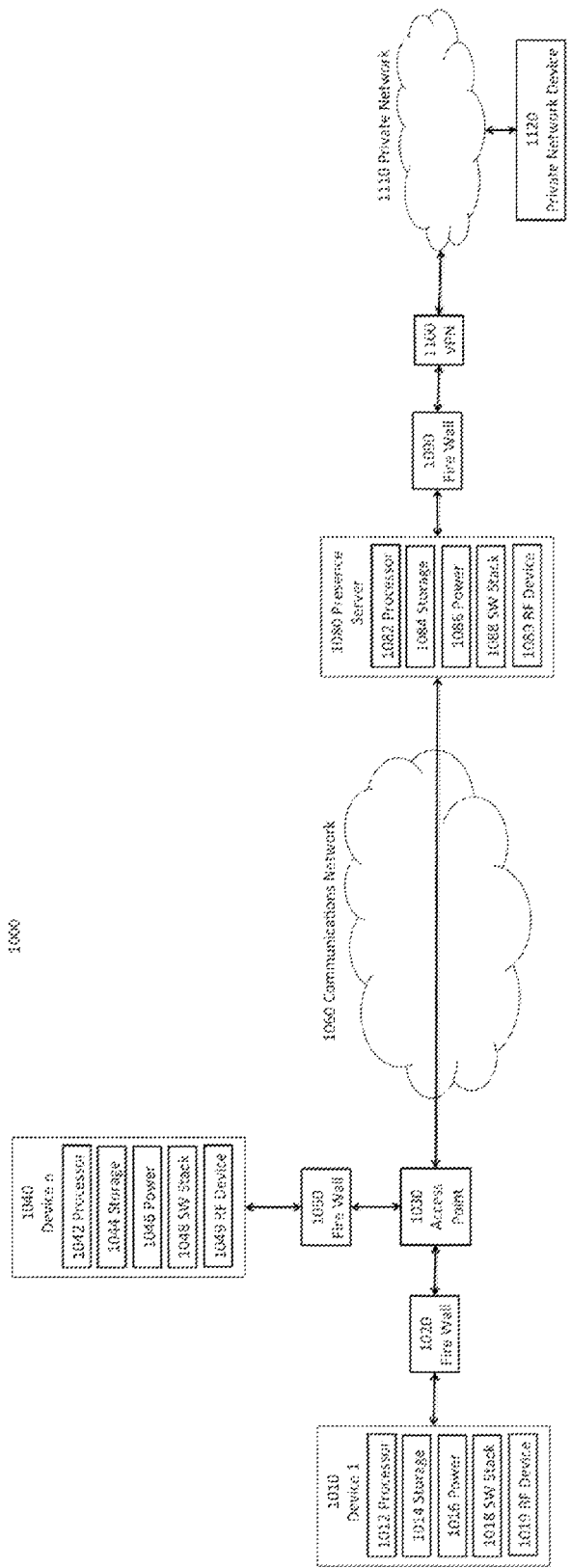
FIG. 1 is a diagram of an exemplary embodiment illustrating a system for enabling a device to determine the presence information of another device over a secure communication network in accordance with the teachings of the present invention.

FIG. 1 is a diagram of an exemplary embodiment for a system 1000 to enable a device 1040 to determine the presence information of another device 1010 over a communication network 1060. First the system 1000 comprises at least one device 1010. The device 1010 may include a smart phone, tablet PC, notebook PC, desktop PC, remote monitoring device, camera, sensor, or any other device that transmits and receives data. The device 1010 may be used for any type of communication, computing, or electronic operation. The invention is applicable to both mobile and fixed devices since either type typically transmits data to and from each other. The device 1010 may comprise hardware components such as a processor 1012, storage 1014, power 1016, and RF devices 1019. The device 1010 may also include a software stack 1018 that may include user-based application software, libraries, command line tools, virtual machines ("VM"), and operating systems.

The device's 1010 presence information may be used to indicate status such as the ability and willingness of the device 1010 to communicate. The presence information may be made available to other devices 1040 to convey availability and mechanism for communication. The presence information may be used for a wide range of applications such as email, instant messaging, voice over IP, or social media applications.

The presence information may include any type of message such as whether the device 1010 is available for communication, unavailable for communication, how it can be contacted for future communication, should not be disturbed, or the location of the device 1010. The presence information data may take the form of any data type including custom and standard protocols such as the Instant Message and Presence Protocol (IMPP), the common profile for presence and instant messaging (CPP), the Session Initiation Protocol (SIP), the mobile Instant Messaging and Presence Service (IMPS), the XML-based OMA Instant Message and Presence Service (IMPS), or the XML-based Extensible Messaging and Presence Protocol (XMPP).

Next, the device 1010 is coupled to a firewall 1020, which in turn is coupled to an access point 1030. The firewall 1020 can be either a hardware and/or software based solution used to keep the devices 1010 and communication networks 1060 secure. The firewall 1020 is used to control the incoming and outgoing data traffic by analyzing the data packets and determining whether the data packets should be allowed through or not, based on predetermined rules or other criteria. The hardware or software components that make up the firewall 1020 may be contained within the device 1010, access point 1030, presence server 1080, or other components within the communication networks 1060.

The access point 1030 may be a network address translator (NAT) or any similar device designed to facilitate and manage communication amongst the many devices connected to the communication network 1060. The access point 1030 allows the device 1010 to connect to the communication network 1060 using Wi-Fi, Bluetooth, 3G, 4G, or any similar wireless, or wired communication protocol. The access point 1030 may connect to a router within the communication network 1060. In addition, the access point 1030 may be integrated within a component of the communication network 1060, such as a router. For example, the access point in a cellular communication network is vital, since the cell phones are not designed to communicate directly with each other. In such an example, the access point acts like a broker facilitating communication from one cell phone to another.

Next the access point 1030 is coupled to the communications network 1060. The communication network 1060 may be a wired or wireless communication network. The communication network 1060 may include a public or private network such as the Internet, intranet, telecommunications system, or other network capable of transmitting electronic data. The communication network 1060 may also be a secure network, in which a secure connection, referring to FIG. 2 2400 is established to allow the device 2010 and presence server 2080 to communicate with each other privately.

Next the presence server 1080 is also coupled to the communications network 1060. The presence server 1080 may include the hardware (processor 1082, storage 1084, power 1086) and software 1088 components to gather presence information from multiple devices (i.e. 1010 and 1040) and then to share the presence information between the devices (i.e. 1010 and 1040). The presence server 1080 may gather and distribute presence information in real time. The presence server 1080 intends to gather sufficient presence information such that the other device 1040 has improved chances of communicating with the first device 1010. The presence server 1080 contains relatively insensitive data, i.e. only the device's 1010 presence information, and is isolated from sensitive components, such as the private network 1110. Any breach to the presence server 1080 would also be short lived because the presence information is constantly being updated in real time.

Next, the presence server 1080 may be connected to a private network 1110 via a firewall 1090 and/or a virtual private network 1100. The private network 1110 may be a wired or wireless communication network. The private network 1110 may include a public or private network such as the Internet, intranet, telecommunications system, or other network capable of transmitting electronic data. The private network 1110 may also be a secure network, in which a secure connection may be established to allow the private network device 1120 to communicate with other network devices privately.

Finally another device 1040 is connected to the communication network 1060 via another firewall 1050 and the access point 1030. The other device 1040 is available to receive the presence information regarding the first device 1010 from the presence server 1080. Device 1040 and firewall 1050 may have similar properties to the previously described device 1010 and firewall 1020.

Figure 2A:
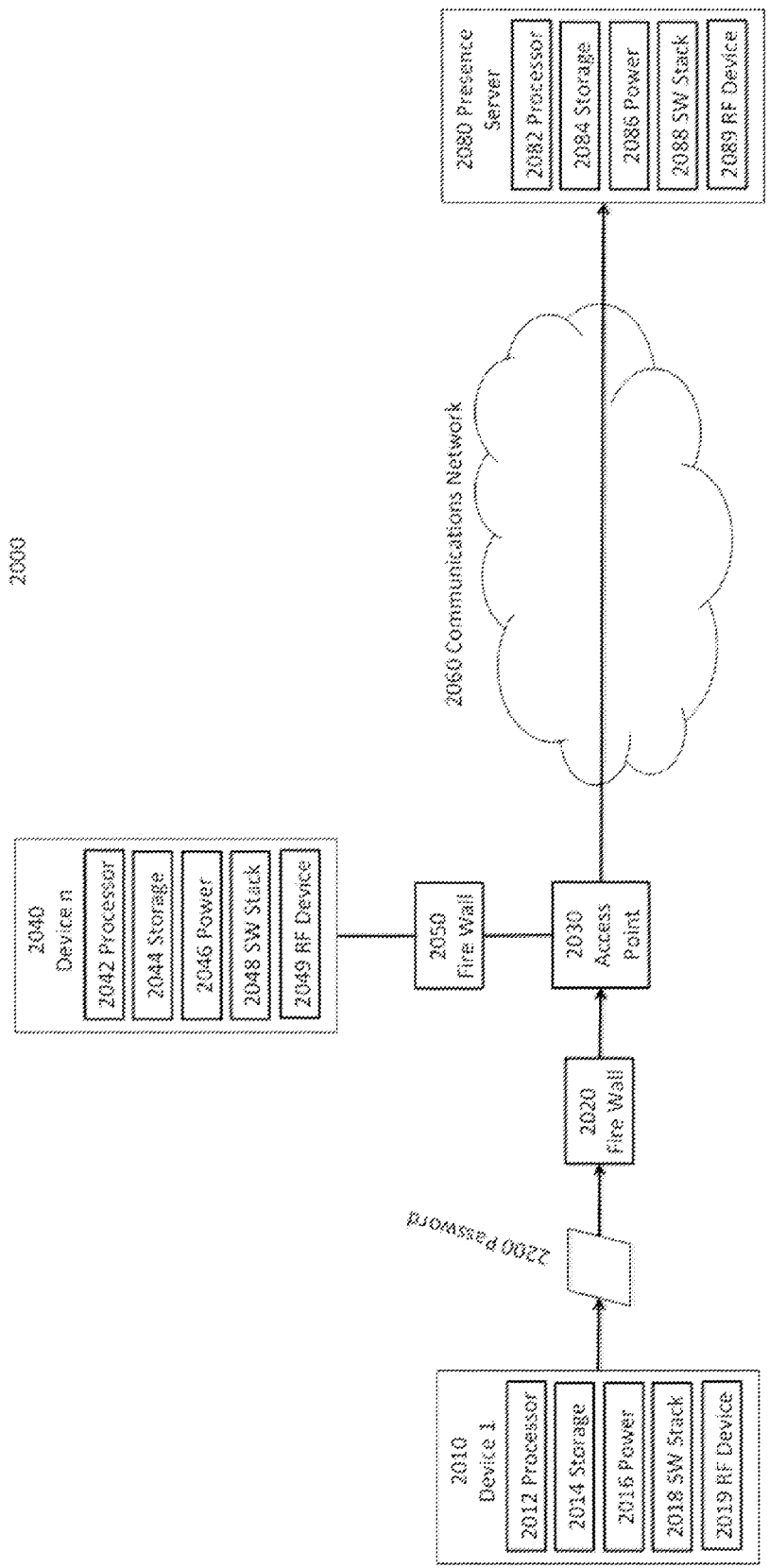
FIG. 2A is a diagram of an exemplary embodiment for a method to enable a device to determine the presence information of another device over a secure communication network in accordance with the teachings of this invention.
Figure 2B:
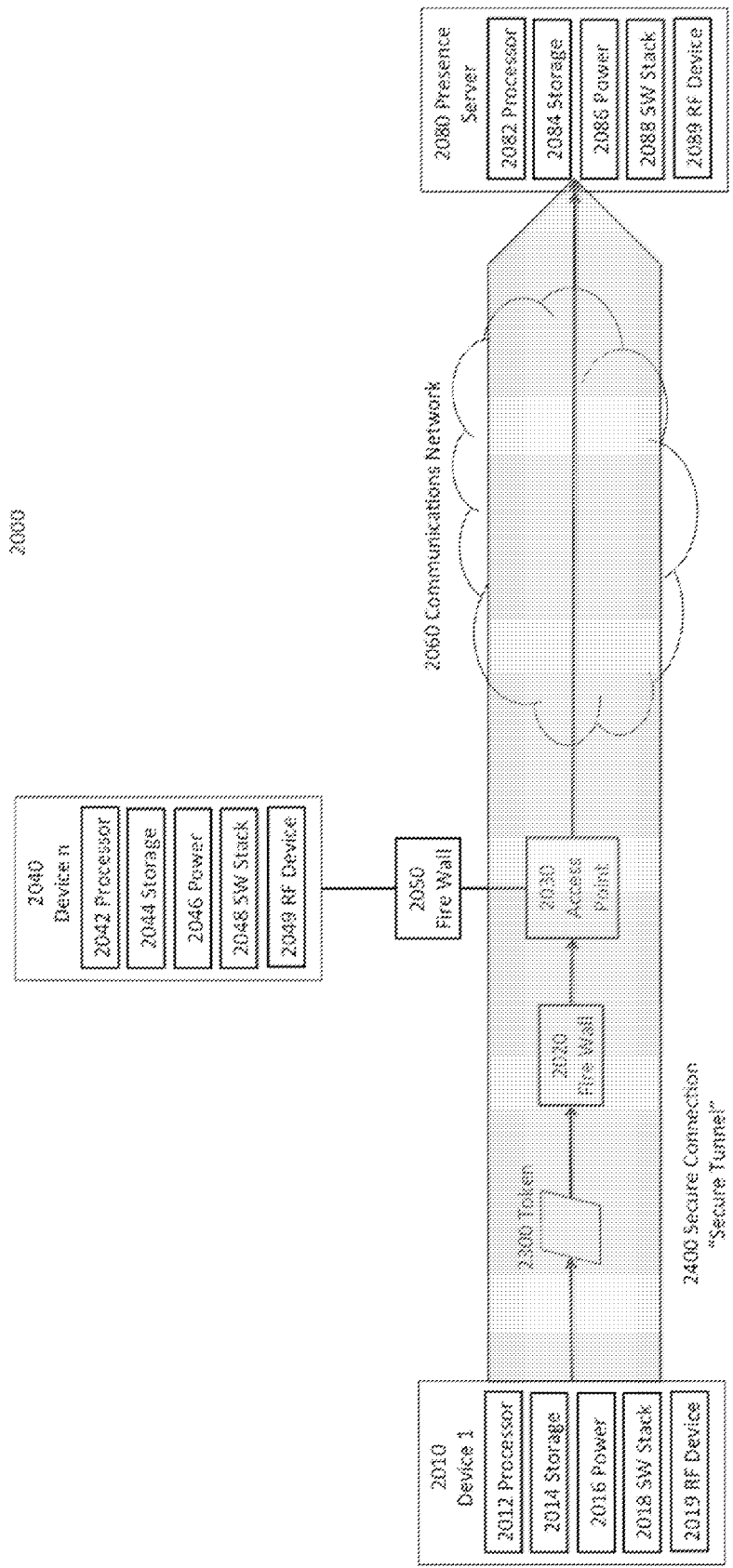
FIG. 2B is a diagram of an exemplary embodiment for a method to enable a device to determine the presence information of another device over a secure tunnel in accordance with the teachings of this invention.
Figure 2C:
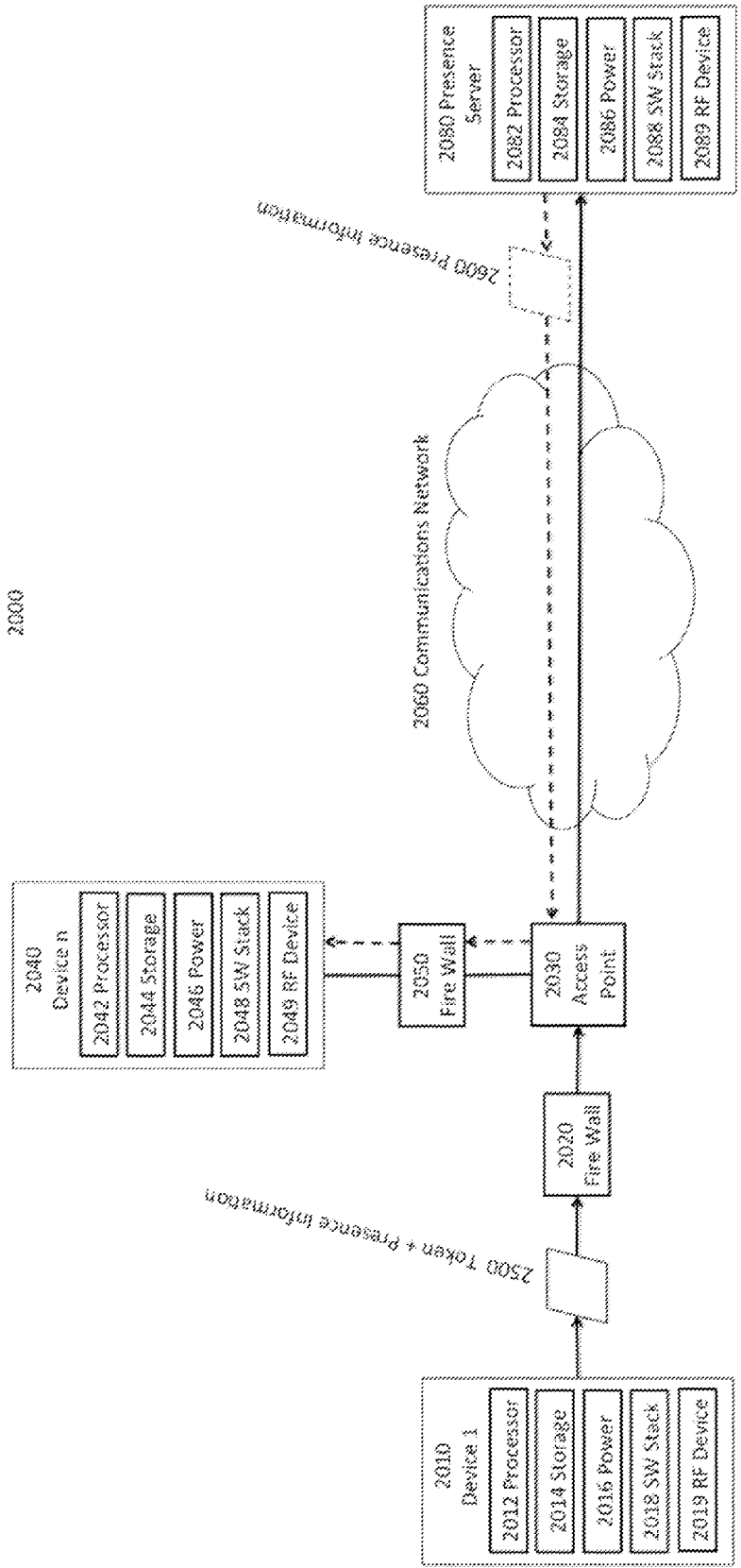
FIG. 2C is a diagram of an exemplary embodiment for transmitting the secure token and presence information over a secure communication network in accordance with the teachings of this invention.

FIGS. 2A, 2B, and 2C are diagrams of an exemplary embodiment for a method 2000 to enable a device 2040 to determine the presence information of another device 2010 over a communication network 2060. First, the device 2010 and a presence server 2080 establish a secure connection 2400 in which the device 2010 and the presence server 2080 authenticate each other to establish the initial secure connection 2400. The communication between the device 2010 and the presence server 2080 over the communication network may be encrypted to maintain privacy.

The data encryption may be accomplished using a data encryption process that converts a plaintext message into cipher text that can be decoded back into the original message, such as the block or stream cipher based encryption schemes. Components of the invention such as the devices 2010 and 2040, presence server 2080, firewall 2020 and 2050, and access point 2030 may include a cryptographic engine consisting of hardware and, or software that utilizes a data encryption algorithm to secure data from unauthorized access. These components may include a stand-alone module consisting of the necessary algorithm data path and a control processor chips and associated software. Likewise these components may be integrated within the devices 2010 and 2040, presence server 2080, firewalls 2020 and 2050, and access point 2030. To decrypt the encrypted data, these components first authenticate the data as one from a known and trusted source then it transforms the encrypted data using a decryption algorithm, or a key, to make the data readable. With the decrypted data, these devices are able to identify the data's final destination information such as a destination device's name, IP address, port number, authentication information, and the presence information. If decryption of authentication fails, the encrypted data packet may be dropped.

The secure connection 2400 may be established using provisions and policies to prevent and monitor unauthorized access, misuse, modification, or denial of the communication network 2060 and device 2010. The device 2010 and communication network 2060 may use a password 2200, or other authenticating information, to gain access to information and programs within their authority. The authentication information may include one-factor authentication such as a password, two-factor authentication such as a password and a security token, or three-factor authentication such as a password, security token, and biometric scan. Once the secure connection 2400 is established, the firewall 2020 may enforce access policies such as what services are allowed to be accessed by the devices, or which other devices may be communicated with.

Next, while a secure connection 2400 with the presence server 2080 is established, the device 2010 generates a randomly created token 2300 and provides it to the presence server 2080. The token 2300 is used as a shared-secret by the device 2010 and the presence server 2080 to secure future presence communications over a unsecure, or even a secure connection. The token 2300 is secure from being intercepted from malicious devices because it is initially transmitted through the secure tunnel 2400. The token 2300 may also be a randomly generated code used only once, such as a 256 bit random number. The token 2300 may take on any size and value so long as it is statistically optimized to prevent repeated use or collision. The presence server 2080 will associate the token 2300 with the device 2010 and store this information for future reference. Likewise, the device 2010 also stores the token 2010, such as in persistent memory, for future use. Thus the token 2300 is available to the device 2010 even if the power to the device 2010 is cycled, or the device 2010 is reset.

Next the secure connection 2400 may be terminated. The secure connection 2400 may be terminated by any means. The token 2300 can be used to send presence data to the presence server 2080 at any time because the token only protects low value information and the information will lose its value in a short time.

Next, without the need to again enter a password 2200 or establish a secure connection 2400 with the presence server 2080, the device 2010 sends the presence information 2500 to the presence server 2080 over an arbitrary connection encrypted and/or authenticated with the token 2300. The device 2010 uses the token to secure a connection with the presence server 2080. The presence server 2080 will recognize the sender of the data and associate it with the device 2010 by retrieving the token and association information from the presence server's 2080 storage 2084 (i.e. persistent memory) and validating and/or decrypting the data using the token. The device 2010 may continuously send presence information 2500 secured with token 2300 to the presence server 2080 to keep a return path open through the communication network 2060. This is possible regardless of what firewall, or other control mechanism the device 2010 may be hiding behind. If the device 2010 stopped continuously sending the presence information 2500 secured with token 2300 to the presence server 2080, the device 2010 may loose its connection through the communication network 2060 because the communication network's 2060 resources may be reallocated to other devices. Thus the device 2010 may optimize the timing in which it sends presence information 2500 secured with token 2300 to establish a "continuous presence" with the communication network 2060. In other words, the device 2010 would always have a connection through the communication network 2060 and never loose the communication resources to other devices. If the presence server does not receive secure presence information from device 2010 in a timely manner then the presence server deems device 2010 to be not present. Next, the presence server 2080 may share the first device's 2010 presence information 2600 to another device 2040.

Finally when the token 2300, or the shared-secret, expires based on ephemerally or otherwise defined conditions the device 2010 may establishes a new token 2300 when the user again provides a password 2200 to establish another secure connection 2400 with the presence server 2080. The expiration time may vary depending on the sensitivity of the application. For example, in a military application the token 2300 might expire after seven days or fewer, and in a commercial setting the token 2300 may expire after several months. The token 2300 may also be refreshed each time the device 2010 establishes a secure connection 2400 with the presence server 2080, even if the original expiration criteria has not been met.

Throughout this description, references were made to components of the system coupled together in a manner that allows the exchange and interaction of data, such that the operations and processes described may be carried out. For example, the components may be coupled with electrical circuitry, or through wireless networks that allow the devices to transfer data, receive power, execute the operations described, and provide structural integrity. The invention may also be enabled with more components than described in the specification. For example, any number and combination of devices, software applications, communication networks, access points, firewalls, and presence servers may be utilized to enable and scale out this invention.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:
1. A system enabling a second device to determine a presence information of a first device comprising:
the first device coupled to an access point via a first firewall;
the second device coupled to the access point via a second firewall;

the access point coupled to a presence server via a communication network, wherein the access point facilitates communication between the first device, the second device, and the presence server;

wherein the first device establishes a secure connection with the presence server via the access point and over the communication network, and while the secure connection with the presence server is established the first device generates a token uniquely associated with the first device, and provides the token to the presence server;

wherein the first device uses the token as an encryption key to encrypt a presence information of the first device;

an unsecure network connection, wherein the first device sends the encrypted presence information to the presence server over the unsecured network connection, and the presence server uses the token to decrypt the encrypted presence information to produce the presence information of the first device, and the first device keeps a continuous return path open through the unsecure network connection by optimizing the timing in which the first device sends an updated presence information to the presence server;

the second device, which receives the presence information of the first device from the presence server.

2. The system of claim 1, wherein the presence server is additionally connected to a private network via a third firewall.

3. The system of claim 2, wherein the private network is a virtual private network.

4. The system of claim 1 wherein the first device comprises a software stack including a user-based application, a set of libraries, a command line tool, a virtual machine ("VM"), and an operating system.

5. The system of claim 1 wherein the first firewall comprises a hardware solution and a software solution used to keep the first device secure.

6. The system of claim 1 wherein the first firewall and the second firewall are used to control an incoming data traffic and an outgoing data traffic by analyzing the data traffic and determining whether the data traffic should be allowed through, based on predetermined rules.

7. The system of claim 1 wherein the first firewall is contained within the first device.

8. The system of claim 1 wherein the access point comprises a network address translator (NAT) designed to facilitate and manage communication amongst any devices connected to the communication network.

9. The system of claim 1 wherein the access point allows the first device to connect to the communication network using Wi-Fi, Bluetooth, 3G, 4G, or any similar wireless, or wired communication protocol.

10. The system of claim 1 wherein the access point is part of a cellular communication network and acts as a broker to facilitate communication from the first device to the second device when the devices are not designed to communicate directly with each other.

11. A method enabling a first device to provide a presence information of the first device to a presence server comprising:

the first device coupled to an access point via a firewall, wherein the access point facilitates the first device in establishing a secure connection over a communication network to a presence server;

while the secure connection with the presence server is established, the first device generating a token that is uniquely associated with the first device, and providing the token to the presence server over the secure connection;

the first device terminating the secure connection with the presence server;

the first device using the token as an encryption key to encrypt the presence information of the first device to produce an encrypted presence information; and the first device establishing an unsecure connection over the communication network and sending the encrypted presence information to the presence server over the unsecured network connection, wherein the first device optimizes the timing in which the first device sends an updated presence information to the presence server to keep a continuous return path open through the unsecured network connection.

12. The method of claim 11, wherein the firewall enforces an access policy including what services are allowed to be accessed by the first device and which other devices the first device may communicate with.

13. The method of claim 11, wherein the token is a randomly generated code and only used once.

14. The method of claim 11, wherein the token comprises any size and any value and is statistically optimized to prevent repeated use or collision.

15. The method of claim 11, wherein the presence server associates the token with the first device and stores the presence information for future reference.

16. The method of claim 11, wherein the presence server will recognize a data sent from the first device by retrieving the token and the presence information and validating and decrypting the data using the token as a decryption key.

17. The method of claim 11, wherein the first device establishes a new token when a user of the first device again establishes a new secure connection with the presence server.

18. The method of claim 11, wherein the token is refreshed each time the first device establishes a secure connection with the presence server, even if the original expiration criteria has not occurred.

* * * * *